(12) United States Patent
Leonard

(10) Patent No.: US 8,510,473 B1
(45) Date of Patent: Aug. 13, 2013

(54) CONVERTING MESSAGE CHARACTER SETS FOR A QUEUE MANAGER

(75) Inventor: Mark Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 485 days.

(21) Appl. No.: 12/792,155

(22) Filed: Jun. 2, 2010

(51) Int. Cl.
*G06F 15/16* (2006.01)

(52) U.S. Cl.
USPC ............ 709/245; 709/232; 709/242; 709/249

(58) Field of Classification Search
USPC ....................................... 709/245; 341/50, 60
See application file for complete search history.

(56) References Cited

U.S. PATENT DOCUMENTS

2009/0172395 A1* 7/2009 Chen et al. .................... 713/168
2010/0204981 A1* 8/2010 Ribeiro et al. ................... 704/8

OTHER PUBLICATIONS

Data Conversion under Webshepre MQ, Oct. 2009, IBM.*
Saida Davis and Peter Broadhurst, Redbooks, WebSphere MQ V6 Fundamentals, IBM WebSphere.software, ibm.com/redbooks, 446 pages, First Edition (Nov. 2005). This IBM Redbook edition is an update to the Redpaper MQSeries Primer, REDP-0021. This edition applies to Version 6, Release O, Modification O, of IBM WebSphere MQ (product No. 5724-H72).
Ben Mann, Worldwide Product Manager, Providing a backbone for connectivity with SOA Messaging, IBM WebSphere.software, Service oriented architecture solutions, White paper, Updated: Jun. 2009, 32 pages, ibm.com/webspheremq, Copyright IBM Corporation 2009, Produced in the United States of America Mar. 2007.

* cited by examiner

*Primary Examiner* — Djenane Bayard (57) ABSTRACT

A method, system, and medium are provided for enabling a queue manager to handle messages written with a character set the queue manager is not configured to handle. In a messaging-middleware environment, queue managers receive messages from applications and communicate the messages to queues where they can be retrieved. Upon receiving a message written in a character set the queue manager is not configured to handle, the queue manager may activate a conversion utility that converts messages from the one character set into a character set the queue manager can handle. The converted message may be returned to the queue manager and stored in the queue to which the message was addressed.

13 Claims, 6 Drawing Sheets

CONVERTING MESSAGE CHARACTER SETS FOR A QUEUE MANAGER

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In a first illustrative aspect, a way to enable a queue manager to handle multiple character sets is provided. The method includes receiving, at the queue manager, a first message over a channel that is addressed to a local alias that points to a local queue managed by the queue manager. The first message uses a first character set that is not supported by the queue manager. The method also includes generating a convert queue within the queue manager. The method also includes changing the local alias to point to the convert queue, thereby causing messages addressed to the local queue to be communicated to the convert queue. The method also includes activating a conversion utility that converts messages from the first character set into a second character set that is supported by the queue manager. The method further includes receiving, at the queue manager, a second message that is addressed to the local alias. The method includes storing the second message in the convert queue. The method further includes receiving a converted version of the second message from the conversion utility. The method also includes storing the converted version of the second message in the local queue.

In another aspect, ways of converting a message received by a queue manager from one character set to another character set are provided. One method includes receiving an activation instruction from the queue manager with conversion instructions. The method also includes reading a message from a convert queue on the queue manager. The method also includes converting the message from a first character set to a second character set. The method also includes writing a converted version of the message to a local queue.

In a third aspect, a way for enabling a queue manager to handle multiple character sets within a messaging-middleware environment is provided. The method includes establishing a convert queue that is managed by a queue manager. The method also includes causing messages addressed to a local queue that is managed by the queue manager to be communicated to the convert queue. The method also includes activating a conversion utility that converts messages from a first character set into a second character set. The method also includes receiving, at the queue manager, a message that is addressed to the local queue. The method also includes storing the message in the convert queue. The method also includes communicating the message to the conversion utility and receiving a converted version of the message back from the conversion utility. The method also includes storing the converted version of the message in the local queue.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention will be better understood from the detailed description provided below and from the accompanying drawings of various embodiments of the invention. Embodiments of the present invention enable a queue manager to handle messages written with a character set the queue manager is not configured to handle. In a messaging-middleware environment, queue managers communicate messages received by the queues they manage to different queues, which may be managed by different queue managers, that store the messages until they can be retrieved by receiving applications. The messages are written using a character set. A delivery failure, or other error, may occur when a queue manager receives a message written in a character set the queue manager is not configured to handle. To avoid a delivery failure, upon receiving a message written in an inappropriate character set, the queue manager may activate a conversion utility that converts messages from the inappropriate character set into a character set the queue manager can handle. As described in more detail below, message routing is changed when the conversion utility is activated. The conversion utility allows a queue manager to handle messages written with a character set that the queue manager is not configured to handle.

Embodiments of the present invention may take the form of a method, system, or computer-readable media with computer-executable instructions embodied thereon. Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Figure 1:
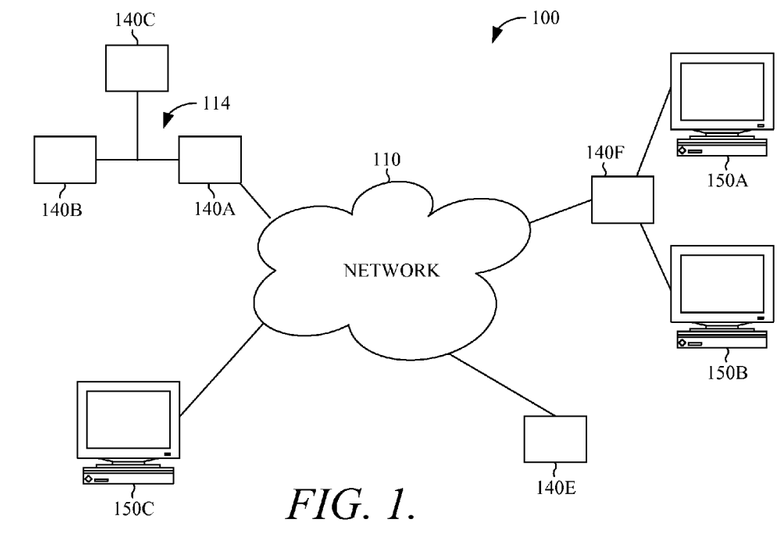
FIG. 1 is a drawing of an illustrative environment in which an embodiment of the present invention operates.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, 140C, which communicate with each other via LAN 114, servers 140E and 140F, all of which communicate with each other via network 110. Operating environment 100 is merely an example of one suitable networking environment.

The client computing devices 150A, 150B, and 150C are configured for storing and/or processing computer-executable instructions and computer-readable data. The client computing devices 150A, 150B, and 150C can be a personal computer, desktop computer, laptop computer, handheld device, cellular phone, consumer electronic, digital phone, smartphone, PDA, or the like.

Network 110 might include a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 can comprise subsystems that transfer data between servers or computing devices. For example, network 110 may also include a point-to-point connection, the Internet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, a processing unit, internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement embodiments of the present invention.

Operating environment 100 is merely exemplary. While the servers 140A-F are illustrated as single severs, they may be scalable. For example, the server 140C may, in actuality, include multiple servers in communication. The single server depictions are meant for clarity.

Figure 2:
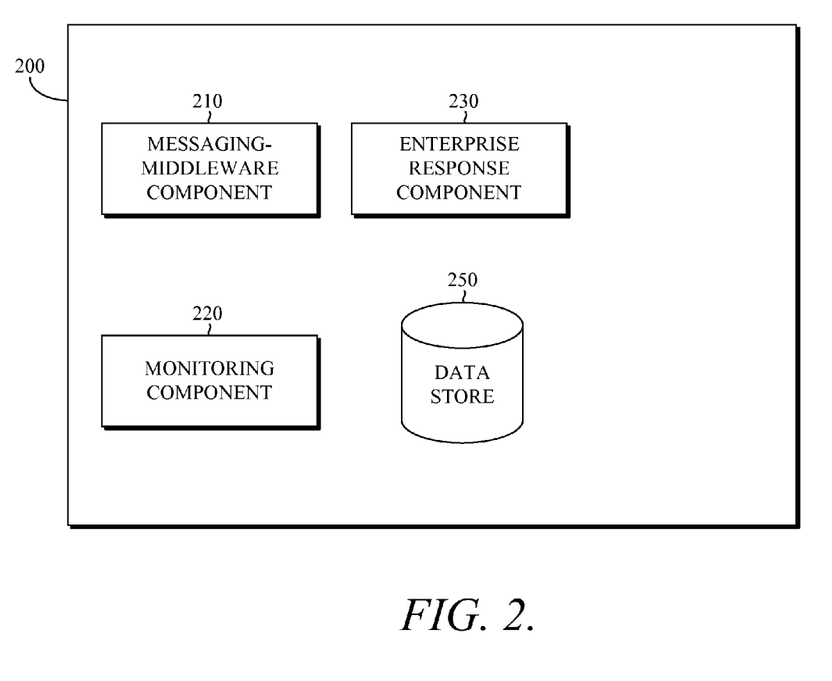
FIG. 2 is a drawing of an operating environment in which an embodiment of the present invention is practiced.

Turning now to FIG. 2, a block diagram depicts an exemplary computing-system architecture 200 suitable for converting messages to character sets suitable for a queue manager. The exemplary computing-system architecture 200 should not be interpreted as having any dependency or requirement related to any single component or combination of components illustrated therein.

Exemplary computing-system architecture 200 includes a messaging-middleware component 210, a monitoring component 220, an enterprise response component 230, and data store 250. Exemplary computing-system architecture 200 can reside in a single computing device. In the alternative, exemplary computing-system architecture 200 may reside in a distributed computing environment that includes multiple computing devices coupled with one another via one or more networks, for example, operating environment 100 described with reference to FIG. 1.

Messaging-middleware component 210 is configured to transfer information between two or more applications in the form of messages. Examples of commercially available messaging-middleware applications (a.k.a. message-oriented middleware) include IBM's WebSphere® MQ (formerly MQ Series®), Fiorano's MQ, Oracle Advanced Queuing (AQ), and Microsoft's MSMQ. For example, information from a front-end application is formed into one or more messages. These messages from the front-end application are placed in a sending queue within the messaging-middleware component 210 and transferred into a receiving queue within the messaging-middleware component 210. A back-end program retrieves the message from the receiving queue. The messaging-middleware component 210 uses queue managers to manage groups of queues. The message is transmitted through channels associated with the messaging-middleware component 210. In this example, the front-end program and the back-end program could be located on any computing device communicatively coupled to the one or more computers on which the messaging-middleware component 210 resides. A messaging-middleware client may reside on both of the computing devices on which the front-end and back-end programs reside to allow interaction with the messaging-middleware component 210.

The messaging-middleware component 210 may manage thousands of queues. In one embodiment, the messaging-middleware component 210 operates in parallel with secondary messaging-middleware components (not shown) containing additional instances of the queues managed by the messaging-middleware component 210. As described previously a queue transfers messages between two programs. Parallel queue instances transfer the same type of message between the same two programs, but are managed by separate messaging-middleware components.

The channels, queues, and queue manager settings within the messaging-middleware component 210 are described by a series of attributes. Each attribute has an associated value or setting. For example, one attribute could be a channel name and the associated setting could be "SprintBillinginfo1." Some attributes are preset, while other attributes measure current conditions within the channel and change over time. For example, the channel name attribute is preset, but the number of channels open on a queue manager changes based on the number of channels currently open.

Monitoring component 220 is configured to monitor messaging-middleware objects (e.g., channels and queues) for upset conditions that could require corrective actions. Examples of commercially available monitoring components include HP Openview®, Q Pasa!® by MQSoftware, Candle's PathWAI, and BMC Patrol. In one embodiment, the monitoring component 220 is able to retrieve, store, and evaluate channel information periodically to ascertain whether an upset condition is present. For example, the number of channels running on a queue manager could be retrieved. Having retrieved one or more attribute values, the monitoring component 220 evaluates one or more attribute values against threshold values within the monitoring component 220. The monitoring component 220 generates an alarm or incident message if attribute values are outside of normal operating conditions. The monitoring component 220 is able to perform one or more calculations with the one or more attribute values to arrive at a threshold. The monitoring component may also scan for message-delivery errors or other errors that indicate a problem has occurred.

The monitoring component 220 is also configured to generate and transmit notifications describing potential problems. A problem may be present when an error message or undelivered messages are identified. In one embodiment, the information about the potential problem is transmitted to enterprise response component 230. In another embodiment, the monitoring component 220 directly notifies a designated responder about the potential problem.

Enterprise response component 230 is configured to coordinate a response to a problem detected in a channel. The enterprise response component 230 receives information regarding a malfunction from a monitoring component 220 or another source. Upon receiving notification of a malfunction, the enterprise response component 230 may page a designated responder to investigate the upset condition. A designated responder can be an individual person or group of people given responsibility to fix upset conditions within certain channels. In another embodiment, the designated responder is a computer application that takes corrective actions. The enterprise response component 230 may help a designated responder trouble shoot by presenting one or more interfaces describing the problem. The interface may also provide tools that help the designated responder correct the problem. In one embodiment, the enterprise response component 230 activates a conversion utility when a queue manager receives a message written in a character set the queue manager is not configured to handle. In another embodiment, the conversion utility may be activated when the receiving application is unable to handle messages in the character set.

Figure 3:
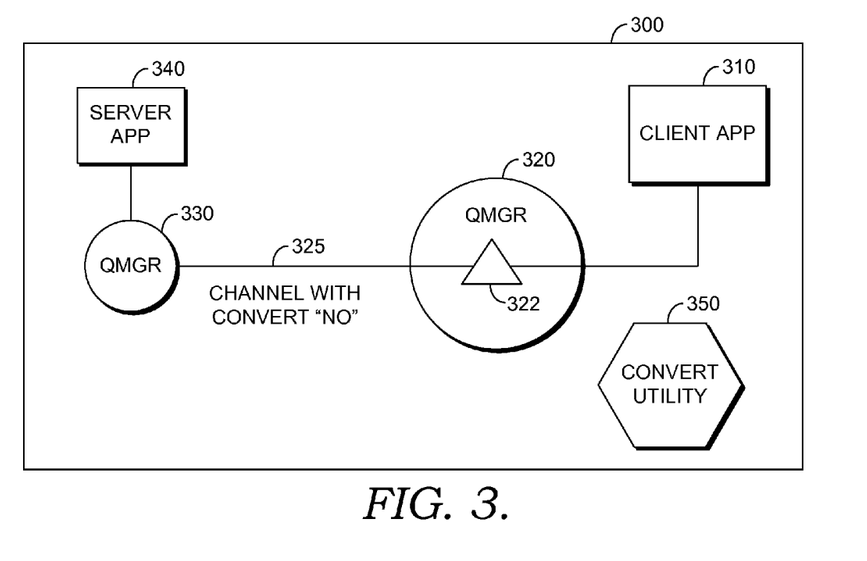
FIG. 3 is a block diagram illustrating objects and communication paths within a messaging-middleware environment, in accordance with an embodiment of the present invention.

Turning now to FIG. 3, a block diagram illustrating objects and communication paths within a messaging-middleware environment 300 is shown, according to an embodiment of the present invention. The messaging-middleware environment 300 may be similar to the messaging-middleware component 210 described previously with reference to FIG. 2. The messaging-middleware environment 300 includes client application 310, queue manager 320, local queue 322, queue manager 330, server application 340, and conversion utility 350. In one embodiment, messages are communicated from server application 340 to queue manager 330. Queue manager 330 places the message in a queue (not shown) that is managed by the queue manager 330. The queue manager 330 communicates the message from the queue manager 330 over a channel 325. Queue manager 320 places the message in the local queue 322, which is managed by the queue manager 320. Queue managers 320 and 330 may both manage hundreds of queues.

The channel 325 is a logical channel. Queue managers and other entities within the messaging-middleware environment 300 use channels to communicate messages. An individual channel can have multiple instances. Multiple instances of the same channel have a common channel definition. Individual channel instances may communicate messages between the same or different endpoints. The channels may be unidirectional or bidirectional. Unidirectional channels may be set up in pairs to facilitate two-way communication between queue managers. The channels may be set up automatically by a message-channel agent or other component. Once established, a channel may be active for a designated period of time before it is terminated. Channels may have the capability to convert message character sets to a different character set in association with their transmission of the message. In one embodiment, the attribute that activates this conversion functionality is set to "no." Once the message is received, queue manager 330 stores the message in a queue from which it may be retrieved by server application 340.

As described previously, queue manager 320 and queue manager 330 may manage a large number of queues. The channel 325 may carry messages between multiple queues managed by queue manager 320 and multiple queues managed by queue manager 330.

In one embodiment, all messages communicated between queue manager 330 and queue manager 320 are transmitted on the same channel 325. In another embodiment, multiple channels may be used to communicate messages between queue managers. Though only one server application 340 and one client application 310 are shown, in some embodiments, multiple applications may be writing messages to or reading messages from queues managed by a queue manager. A single queue manager may communicate with a group of applications.

The conversion utility 350 is configured to convert messages from one character set to another character set. The conversion utility 350 may be activated by a queue manager or enterprise response component when an activation trigger occurs. The activation trigger may be an error message, messages written to a dead letters queue that captures messages that were not delivered, detection of a message written in a character set the queue manager or receiving application cannot handle, and other events. The conversion utility 350 may be activated when the queue manager detects that a messages written in an incompatible character set has been received. In another embodiment, an error that is generated based on an incorrect character set causes the conversion utility to be activated.

Figure 4:
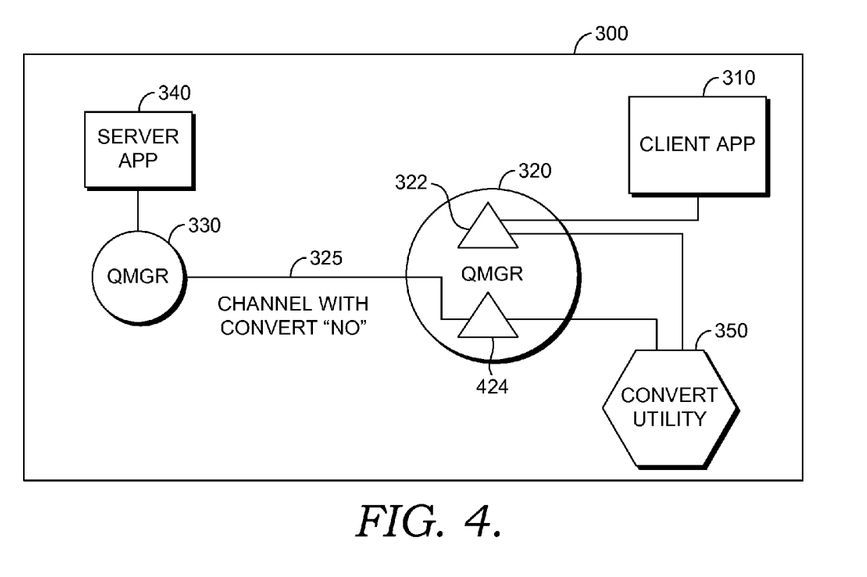
FIG. 4 is a diagram illustrating the routing of messages within a messaging-middleware environment 300 after activation of a conversion utility, in accordance with an embodiment of the present invention.

Turning now to FIG. 4, a diagram illustrating the routing of messages within a messaging-middleware environment 300 after activation of a conversion utility 350 is shown, in accordance with an embodiment of the present invention. The client application 310, the queue manager 320, the local queue 322, the channel 325, the queue manager 330, the server application 340, and the conversion utility 350 have been described previously with reference to FIG. 3. As the conversion utility 350 is activated, the queue manager 320 creates a convert queue 424. The convert queue receives messages originally intended for the local queue 322. In one embodiment, messages destined for local queue 322 are routed to the convert queue 424 by using a queue alias to redirect the messages. The queue alias is a definition within a messaging-middleware environment 300 that directs messages addressed to the local queue into the convert queue.

Once in the convert queue 424, the messages are either pushed to the conversion utility 350 or retrieved from the convert queue 424 by the conversion utility 350. The conversion utility 350 then converts the messages from the messages original character set into a target character set and communicates the converted message to the local queue 322. The converted message may be routed to the local queue 322 by using a converted queue alias. The client application 310 may then read converted messages from the local queue 322. This allows messages originally formatted in an incorrect character set to be read by the client application 310 without changes to the client application. In addition, the queue manager may use the converted message to send a receipt confirmation to the sending queue. The delivery confirmation message completes the transfer process between queue managers.

Figure 5:
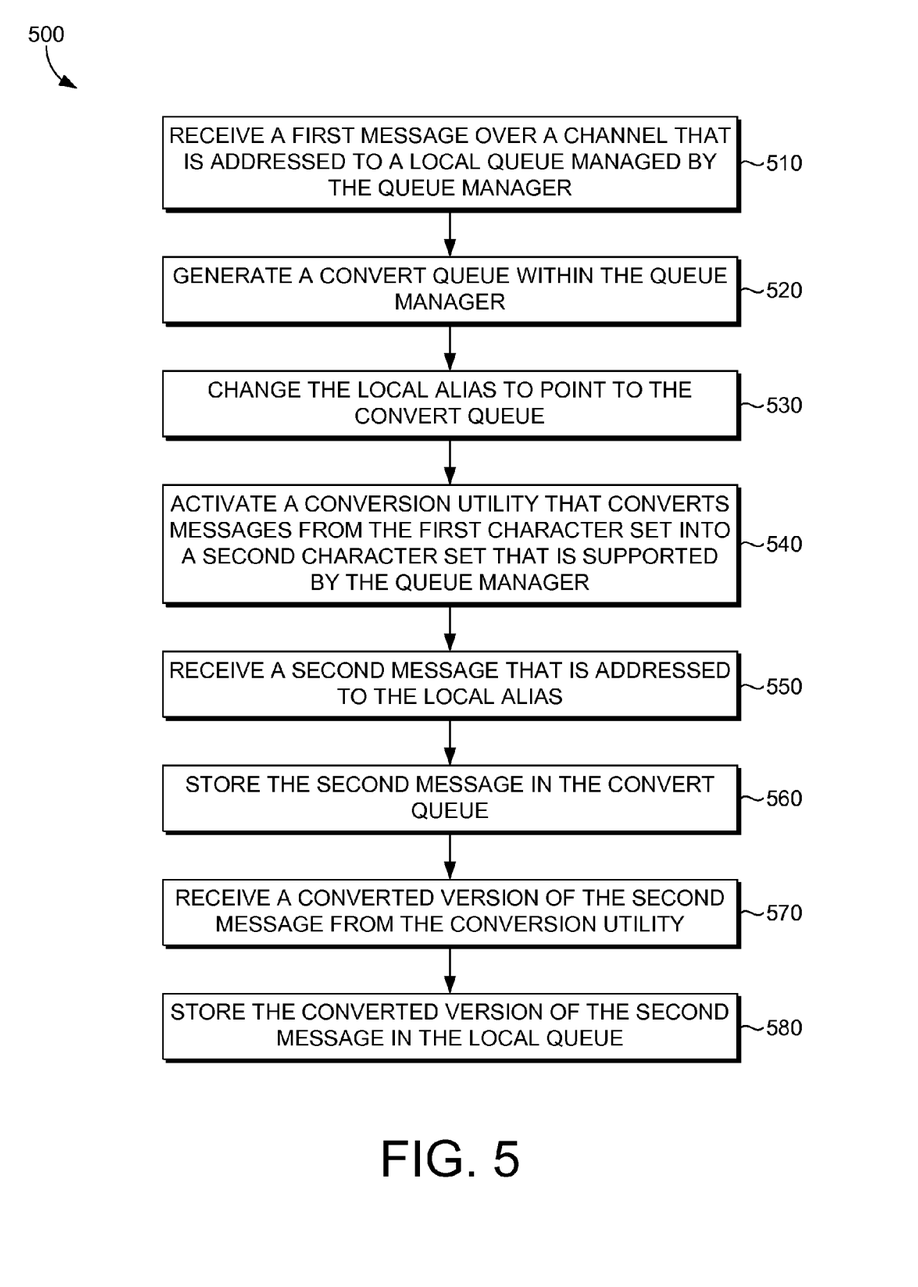
FIG. 5 is a flow diagram showing a method that enables a queue manager to handle multiple character sets, according to an embodiment of the present invention.

Turning now to FIG. 5, a method that enables a queue manager to handle multiple character sets is shown, in accordance with an embodiment of the present invention. The method 500 may be performed in a messaging-middleware environment similar to the one described previously with reference to FIG. 3. Method 500 may be performed automatically without human intervention. Method 500 may be performed until the source of the messages written in the first character set can be updated to use the correct character set. At step 510, a first message is received at a queue manager over a channel. The first message is addressed to a local queue on the queue manager or to a local alias that points to the local queue. The first message is written in a first character set that is not supported by the queue manager. In one embodiment, the queue manager only supports a single character set. Examples of character sets that may be used include 819, 1051, and 1208. The receipt of the first message may cause a message delivery failure within the queue manager, a delivery error to a client application receiving the message, or another kind of error.

At step 520, a convert queue is established within the queue manager. The convert queue receives messages formatted in a character set used in the first message. At step 530, the local alias is changed to point to the convert queue. This causes all subsequently received messages that are addressed to the local queue to be communicated to the convert queue where the messages can be stored until they are converted by a conversion utility.

At step 540, a conversion utility that converts messages from the first character set into a second character set is activated. The second set is supported by the queue manager. A conversion utility may be able to convert messages between two different character sets. In this case, multiple conversion utilities may be available to handle different character sets and that activation message may be directed to a specific conversion utility. In another embodiment, a more robust conversion utility may be able to convert between many different types of character sets.

At step 550, a second message that is addressed to the local alias is received at the queue manager. Because the local alias has been updated to point to the convert queue, the second message is sent to the convert queue where, at step 560, the second message is stored.

At step 570, a converted version of the second message is received from the conversion utility. The conversion utility may have read the second message from the convert queue, converted it to the second character set, and communicated it back to the queue manager. At step 580, the converted version of the message is stored in the local queue. A receiving application may then read the converted message from the local queue and complete the message transfer process between applications. In one embodiment, the second message was sent from a first application to a queue within a different queue manager, which then sends it to the queue manager responsible for the local queue. In one embodiment, the first queue manager may pass along the message in a character set in which it was received even though that queue manager is not configured to handle messages in the character set.

Figure 6:
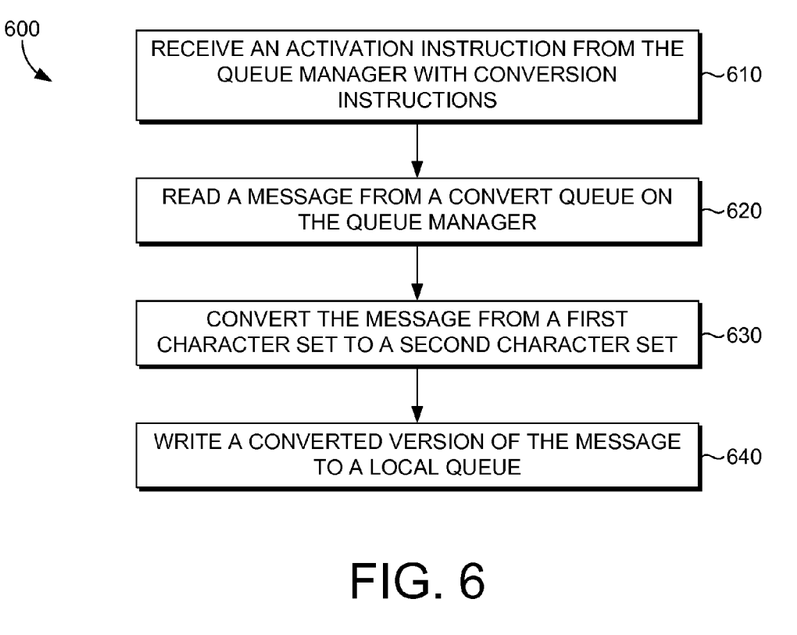
FIG. 6 is a flow diagram of a method of converting a message received by a queue manager from one character set to another character set, according to an embodiment of the present invention.

Turning now to FIG. 6, a method 600 of converting character sets within messages received by a queue manager is shown, in accordance with an embodiment of the present invention. The method 600 may be performed in a messaging-middleware environment that includes one or more queue managers. Method 600 may be performed automatically without human intervention. At step 610, an activation instruction is received from a queue manager with conversion instructions. A conversion instruction may specify a first character set in which messages are presently written and a second character set into which the messages should be converted. The queue manager may send the activation instruction upon detecting errors or communication problems related to a message written in a character set that the queue manager is not configured to handle. In another embodiment, the activation is sent when the queue manager detects that a message written in an incompatible character set has been received.

At step 620, a message is read from a convert queue on the queue manager. As described previously, the queue manager may set up a convert queue to which messages having certain characteristics are saved. The message characteristics may include a destination address. In another embodiment, other address information including an originating application, sending queue, and sending queue manager, as well as final destination application may be considered.

At step 630, the message is converted from a first character set into a second character set and at step 640, the converted version of the message is written to a local queue. A converted queue alias may be used to route the converted message to the local queue. The converted queue alias may be directed to send messages to a local queue, which was the original intended destination of the message. In one embodiment, the conversion instruction specifies the convert queue and the converted queue alias. This provides instructions that a conversion utility may use to determine which queue to read messages from and where to send converted messages.

Figure 7:
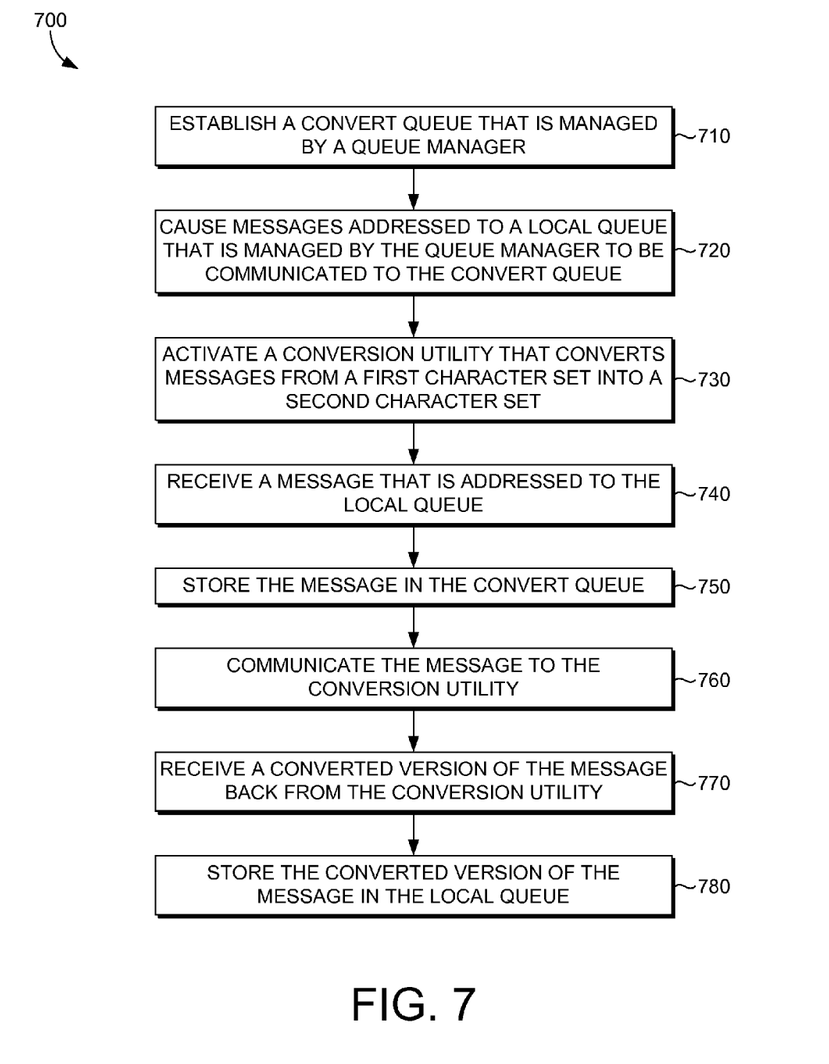
FIG. 7 is a flow diagram of a method of enabling a queue manager to handle multiple character sets within a messaging-middleware environment, according to an embodiment of the present invention.

Turning now to FIG. 7, a method of converting character sets of messages within a messaging-middleware environment is shown, in accordance with an embodiment of the present invention. Method 700 may be performed automatically without human intervention. At step 710, a convert queue is established within a queue manager. At step 720, messages addressed to the local queue are pointed to the convert queue. Previously, a local alias may have pointed to a local queue and the messages are redirected by changing the local alias to point to the convert queue. Changing the local alias to point to the convert queue causes messages addressed to the local queue to be communicated to the convert queue.

At step 730, a conversion utility is activated. The conversion utility converts messages from a first character set into a second character set. The activation message may designate the first character set in which messages will be received and the second character set into which messages should be converted. The address information for the convert queue may also be provided as well as information describing a queue into which the converted messages should be written at the completion of the conversion process.

At step 740, a message that is addressed to the local alias is received at the queue manager. At step 750, the message is stored in the convert queue. At step 760, the message is communicated to the conversion utility. At step 770, a converted version of the message is received from the conversion utility. As described previously, the conversion utility may receive the message and convert it into a converted version of the message. At step 780, the converted version of the message is stored in the local queue. In one embodiment, the local queue is the original destination for the first message.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. One or more non-transitory computer-readable media having computer-executable instructions embodied thereon that when executed by a computing device perform a method that enables a queue manager to handle multiple character sets, the method comprising:

receiving, at the queue manager, a first message over a channel that is addressed to a local alias that points to a local queue managed by the queue manager, wherein the first message uses a first character set that is not supported by the queue manager;

generating a convert queue within the queue manager;

changing the local alias to point to the convert queue, thereby causing messages addressed to the local queue to be communicated to the convert queue;

activating a conversion utility that converts messages from the first character set into a second character set that is supported by the queue manager;

receiving, at the queue manager, a second message that is addressed to the local alias;

storing the second message in the convert queue;

receiving a converted version of the second message from the conversion utility; and     storing the converted version of the second message in the local queue.

2. The media of claim 1, wherein the local queue is not configured to direct the message to be converted from the first character set into the second character set.

3. The media of claim 1, wherein the method further comprises establishing a converted queue alias that points to the local queue.

4. The media of claim 3, wherein the method further comprises instructing the conversion utility to read messages from the convert queue and write converted versions of the messages to the converted queue alias.

5. The media of claim 3, wherein the method further comprises instructing an application that reads from the local queue to read from the converted queue alias.

6. The media of claim 1, wherein the method further comprises communicating the first message to the conversion utility, and writing, by the conversion utility, the converted version of the first message to the local queue.

7. The media of claim 1, wherein the first character set is 1051 and the second character set is 1208.

8. A method for enabling a queue manager to handle multiple character sets within a messaging-middleware environment, the method comprising:

establishing a convert queue that is managed by a queue manager;

causing messages addressed to a local queue that is managed by the queue manager to be communicated to the convert queue;

activating a conversion utility that converts messages from a first character set into a second character set;

receiving, at the queue manager, a message that is addressed to the local queue;

storing the message in the convert queue;

communicating the message to the conversion utility;

receiving a converted version of the message back from the conversion utility; and     storing the converted version of the message in the local queue.

9. The method of claim 8, wherein the method further comprises receiving an indication from an application that reads messages from the local queue that one or more messages read from the local queue is written in a character set that the application is unable to handle.

10. The method of claim 8, wherein the method further comprises receiving, at the queue manager, the message that is addressed to a local alias that points to the local queue, wherein the message is written in the first character set that is not supported by the queue manager.

11. The method of claim 8, wherein the message is in a character set that is not supported by the queue manager.

12. The method of claim 11, wherein the queue manager only supports one character set.

13. The method of claim 8, wherein the method further comprises communicating the converted version of the message to an application that reads from the local queue.

\* \* \* \* \*